United States Patent Office 3,314,821
Patented Apr. 18, 1967

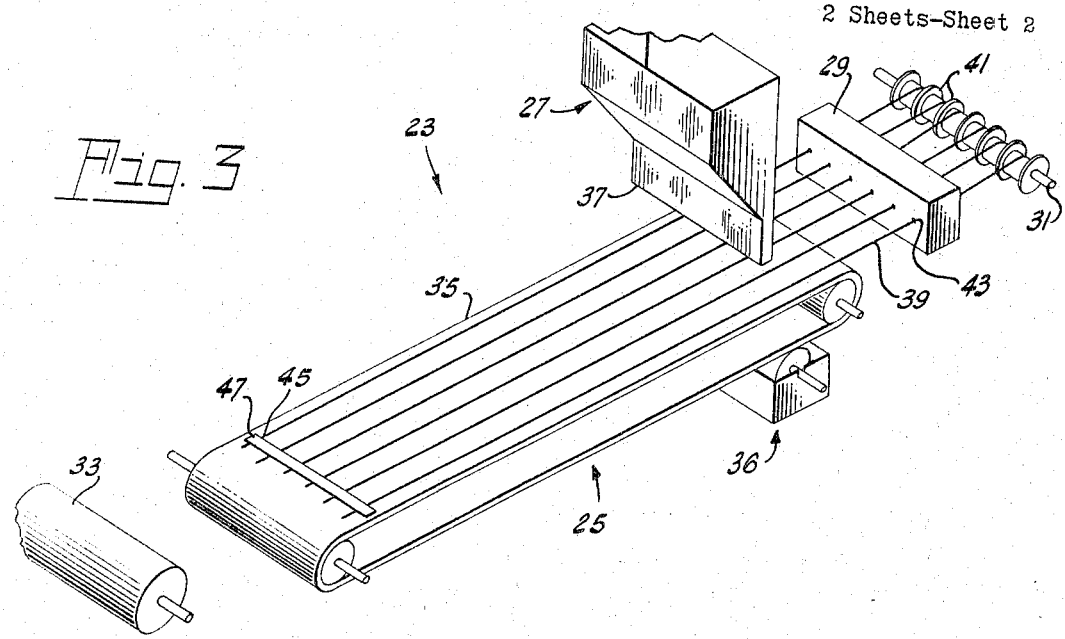
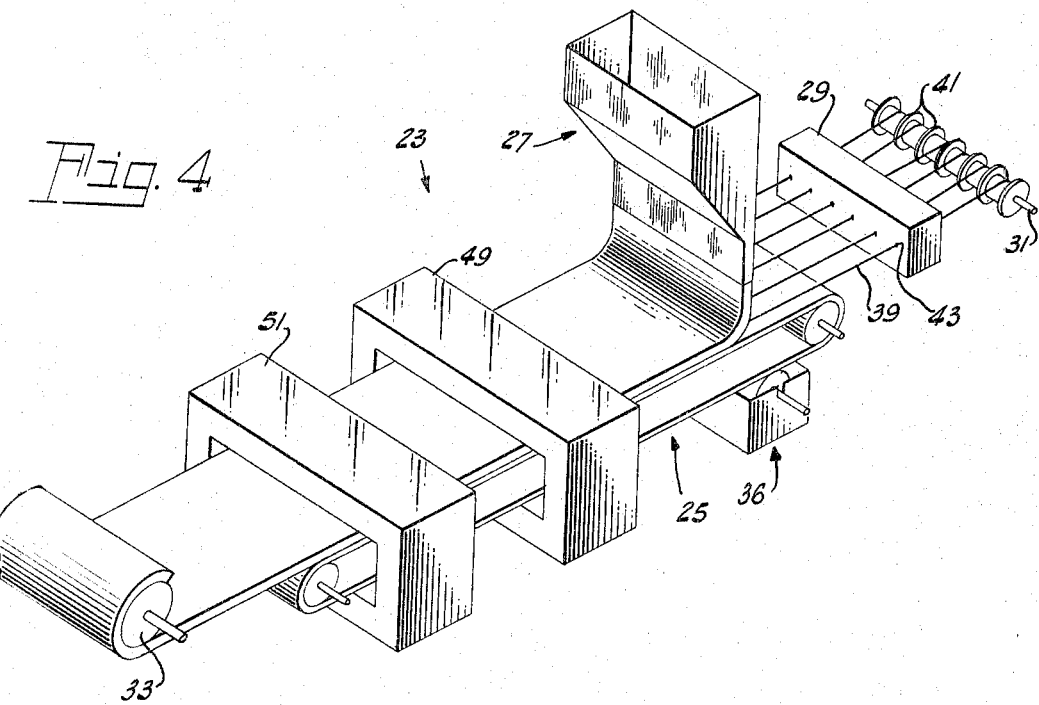

3,314,821
STORAGE BATTERY ELECTRODE OF SINTERED METAL PARTICLES
Robert L. Lambert, Emporium, and William R. McKeirnan, Crosby, Pa., assignors to Sylvania Electric Products Inc., a corporation of Delaware
Filed Feb. 28, 1964, Ser. No. 348,038
4 Claims. (Cl. 136—6)

This invention relates to storage batteries and more particularly to electrodes and the fabrication of electrodes suitable for use in storage batteries.

One of the most popular forms of storage battery electrodes includes a layer of porous metal particles sintered to a wire mesh or screen support with the pores thereof loaded with active electrode material. Prior to the inclusion of the electrode material in the pores, a portion of the porous layer is usually compacted to facilitate the attachment of a connecting means for conveniently interconnecting the electrode and an external contact. Thereafter, the electrodes along with a separator and electrolyte are encased in a container in a manner commonly used to fabricate storage batteries.

In the fabrication of the above-described electrodes, one of several well-established techniques is frequently used. For example, a low viscosity mixture containing metal particles is often sprayed or painted onto the wire mesh, fired to sinter the metal particles and provide a porous layer, a portion of the porous layer compacted, a metal tab attached thereto, and the pores of the uncompacted portion of the layer loaded with active electrode material. Other often used techniques include the application of a high viscosity mixture containing metal particles to a mesh by brushing or stroking and the dispensing of dry metal particles onto a mesh by dumping or pouring and then spreading the dumped materials into a layer.

As far as is known, these techniques are all "batch" processes whereby one or at least a small number of metal structures are provided each time the process is repeated, and such processes frequently have a problem in attaining uniformity and consistency in the product. Also, most "batch" processes are severely strained with regard to productivity, cost per piece, operator skill required, and numerous other factors when competing with a continuous process.

Further, it is well known that structures suitable as electrodes for batteries are preferably of the high porosity type such as in the vicinity of about 80% porosity. Thus, a low viscosity suspension which inherently provides a low porosity structure is unappropriate for a battery electrode. Moreover, a homogeneous dispersion of metal particles is most difficult to maintain in a low viscosity suspension because of the tendency for the particles to "settle out."

On the other hand, a high viscosity suspension provides a high porosity structure such as is preferred for battery electrodes but a high viscosity suspension such as a paste which includes metal particles therein has been found most difficult to repeatedly apply to a wire mesh or screen with uniformity of thickness and porosity by a brushing or stroking technique. Such techniques are not only expensive and time consuming but require highly skilled and closely supervised personnel.

Additionally, although the known dry metal particle spreading techniques are entirely foreign to either of the above-mentioned suspension processes, it has been found that one or more similar problems of uniformity of thickness and porosity, repeatability, cost, productivity, and application to a support are usually encountered.

Moreover, these problems appear especially prevalent as the desired porosity of the structure is increased.

Therefore, it is an object of this invention to provide storage battery electrodes having improved uniformity of thickness and porosity.

Another object of the invention is to enhance the mechanical strength and electrical conductivity of storage battery electrodes having improved uniformity of thickness and porosity.

Still another object of the invention is to provide an improved means for connecting a storage battery electrode to an external conductor.

A further object of the invention is to facilitate the formation of circular-shaped alkaline storage battery electrodes.

A still further object of the invention is to improve the process for fabricating alkaline storage battery electrodes.

And yet another object of the invention is to provide an improved and continuous process for fabricating porous metal plates adapted to formation into storage battery electrodes.

These objects are fulfilled in one aspect of the invention by an electrode having a porous metal particle layer of uniform thickness and porosity and including therein a plurality of aligned and spaced conductors as well as active electrode materials in the pores of the metal layer. The electrode is fabricated by continuously flowing a suspension onto aligned conductors and a support to provide a film casting, drying the casting to provide a self-supporting film, and firing the film to provide a self-supporting metal strip. Then, the metal strip is cut to a desired configuration and the pores thereof loaded with active electrode material to provide a battery electrode.

For a better understanding of the present invention, together with other and further objects, advantages, and capabilities thereof, reference is made to the following disclosure and appended claims in connection with the accompanying drawings in which:

FIG. 3 is a diagrammatic illustration of an apparatus for the continuous fabrication of porous plates for use in electrodes and indicating the beginning of the process; and FIG. 4 is another diagrammatic illustration of the apparatus of FIG. 3 during the continuous fabrication process.

Figure 1:
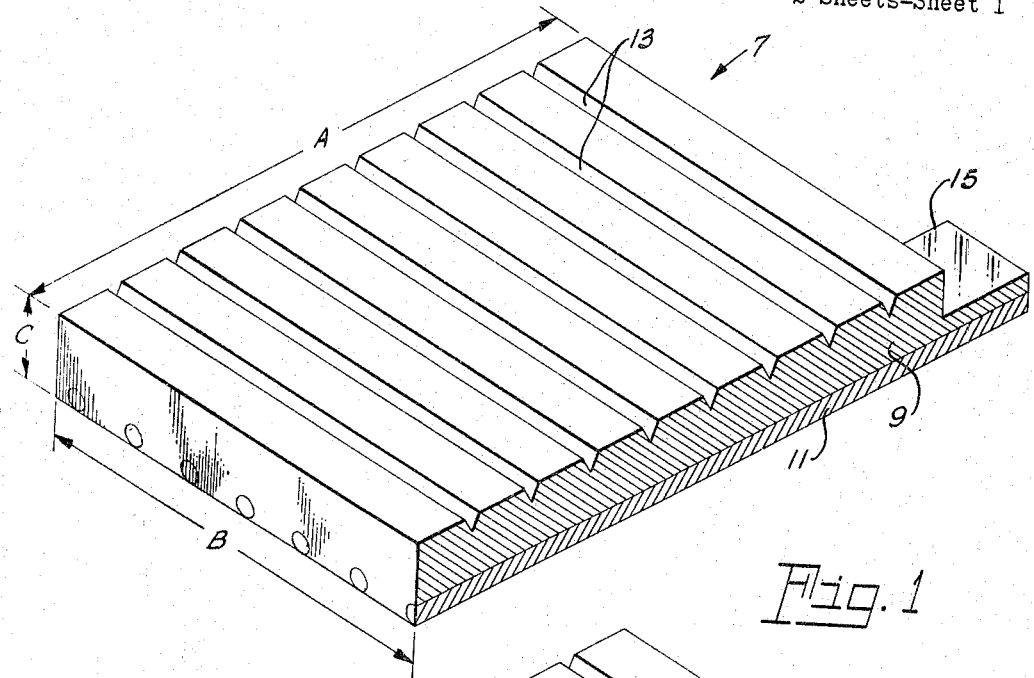
FIG. 1 is a perspective view of a storage battery electrode illustrating the integral conductors and tab portion as well as the location of score marks thereon.

Referring to the drawings, FIG. 1 illustrates a battery electrode 7 having a longitudinal dimension A, a horizontal dimension B, and a thickness dimension C. The electrode 7 includes a porous metal particle layer 9 loaded with active electrode material, a plurality of aligned and spaced conductors 11, parallelly aligned score marks 13 normal to the conductors 11, and a tab portion 15.

The metal particles of the layer 9 must be of a sinterable material, and nickel or an alloy thereof is preferred. Other materials applicable and appropriate for use in the formation of porous structures for battery electrodes include silver, iron, copper, and aluminum, as well as alloys and mixtures thereof. Further, the porosity of the electrode 7 is preferably about 80% and porosities in the range of 50–90% with a thickness dimension C in the range of 0.004 to 0.060 inch having been attained as will be explained hereinafter.

The active electrode material is loaded into the pores of the electrode 7 by any one of a number of well-known and long-established techniques and is of a material adapted to the particular type of battery desired. For example, a nickel-cadmium type battery would have positive electrodes loaded with nickelous hydroxide and negative electrodes loaded cadmium hydroxide.

The porous layer 9 also has integrated therein a plurality of substantially parallelly aligned and laterally spaced metal conductors 11. These conductors 11 preferably extend in the direction of the longitudinal dimension A and serve to increase the mechanical strength as well as the electrical conductivity of the electrode 7. Moreover, the conductors may be displaced from the center of the electrode 7 in the direction of the thickness dimension C when such a displacement is found desirable.

The conductors 11, like the metal particles, are preferably of a nickel or nickel alloy material although any of the above-mentioned metal particle materials are applicable and appropriate. Prior to inclusion of the conductors 11 in the metal layer 9, the material used for the conductors 11 should either have, or be treated to have, a minimum amount of resiliency in order to permit the flexing or bending of the electrode 7 without fear of the conductors 11 rupturing the particle layer 9 and springing from within the electrode 7.

When it is desired to form the electrode 7 into a circular configuration, the conductors are preferably displaced from the center in the direction of the thickness dimension C and a plurality of parallelly aligned score marks 13 are provided on the surface of the electrode 7 opposite to the direction of the displacement of the conductors 11. These score marks 13 are laterally spaced and extend in a direction B substantially normal to the direction A of the conductors 11. Alternately, the score marks 13 may be disposed on both surfaces of the electrode 7. Thus, the combination of displaced conductors 11 and score marks 13 facilitate the formation of an electrode 7 having a circular configuration which is not so weakened as to permit the conductors 11 to leave the metal particle layer 9.

Figure 2:
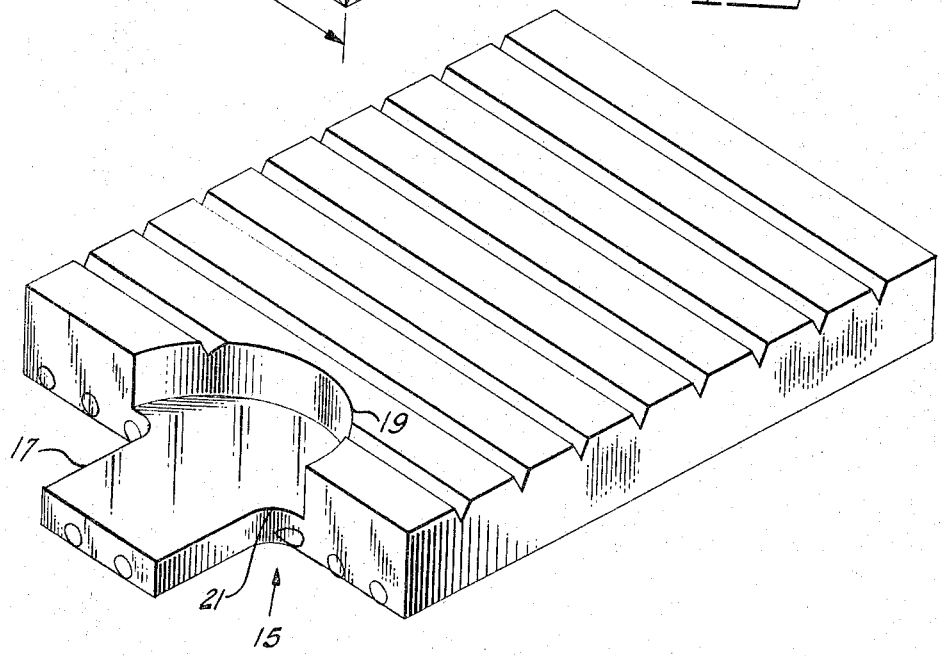
FIG. 2 is another perspective view of a storage battery electrode showing the compacted integral tab portion.

Additionally, a tab portion 15 may be integrated into the electrode 7 as best illustrated in FIG. 2. Herein, the tab portion 15 had a shaped outwardly extending segment 17 and a shaped inwardly extending segment 19 with a jointure 21 therebetween. Certain of the conductors 11 extend in a longitudinal direction through the electrode 7, the inwardly extending segment 19, the jointure 21, and the outwardly extending segment 17. Thus, the mechanical strength, as well as the conductivity of the tab portion 15, is enhanced. To further increase the mechanical strength of the jointure 21, the inwardly extending segment 19 is preferably arc-shaped with the cord of the arc-shaped segment 19 substantially equal in length to the width of the shaped outwardly extending portion 17 at the jointure 21 therebetween. Also, the tab portion is compacted to a density of up to 100% in order to promote the attachment of external connections thereto by welding and similar well-known attachment means.

Referring now to the electrode fabricating process, there is first provided a metal containing suspension which is flowed onto a plurality of aligned conductors and a support to provide a film casting. The casting is dried to a pliable self-supporting film and fired to provide a pliable self-supporting porous metal strip. Thereafter, the metal strip is cut to size and then loaded with active electrode materials to provide a battery electrode.

Essentially, the continuous portion of the process may be interrupted as soon as the pliable self-supporting film is provided, but preferably, the process is continuous, at least until the porous self-supporting metal strip has been provided. Moreover, numerous variations in the sequence of operations are possible and applicable to the process. For example, the process of cutting the metal strip into electrode shapes, compacting a portion thereof, and loading the pores with active electrode material may be a continuous process. Alternately, an integral tab may be included, score marks may be introduced, and the process interrupted at any stage after the formation of the self-supporting film.

In order to carry out the process, there is first provided a metal containing suspension such as disclosed in Applicant's co-pending application assigned to the Assignee of this application and entitled "Powdered Metal Film Composition," Ser. No. 105,889, filed April 27, 1961. Herein, Applicants have set forth the advantages and details of a suspension particularly adapted to the formation of a film casting.

Briefly, the suspension includes sinterable metal particles, as organic binder, a plasticizer, and a mixture of volatile solvents applicable to the binder. The suspension is prepared for casting by measuring the solvents, dissolving the binder therein, adding the metal particles to the mixture, and ball milling the mixture to homogeneously disperse the metal particles in the binder. The mixture has a high viscosity and is in the form of a viscous mass which has many advantages, including the homogeneous distribution of the relatively heavy metal particles, freedom from entrapped gases, enhanced control of viscosity, a controlled rate of solvent evaporation, and uniformity of thickness and porosity when cast as a film.

It has been found that the suspension should have metal particles in the range of about 25 to 75% by weight of the suspension and a viscosity in the range of 25,000 to 75,000 cps. as measured on a Brookfield viscosimeter. When the metal content is less than about 25%, there is not sufficient contact between the particles to provide a self-supporting metal strip while metal particles in an amount greater than about 75% do not permit the inclusion of sufficient binder material to permit the formation of a self-supporting film. Also, a suspension having a viscosity less than about 25,000 cps. does not permit the formation of a film having the desired thickness, porosity, and homogeneously dispersed metal particles while a suspension having a viscosity greater than about 75,000 cps. is not adaptable to casting with uniformity of thickness and porosity.

As to apparatus for the continuous process of flowing the suspension to provide a film casting, drying the casting to provide a pliable self-supporting film, and firing the film to provide a porous metal strip, reference is made to the patent of Crosby et al., Patent No. 2,965,927 entitled, "Film Casting Apparatus," assigned to the assignee of the present application in conjunction with FIGS. 3 and 4 of the drawings. In FIGS. 3 and 4, a film forming apparatus 23 includes an endless conveyor 25, a suspension dispensing means 27, a tension device 29, a spool holder 31, a take-up spool 33, a drying means 49, a firing means 51, and an activating means (not shown) for the apparatus 23.

In the diagrammatic illustration of FIG. 3, the apparatus 23 has a conveyor 25 with an endless belt or support 35 which operates in the well-known manner of a conventional endless-belt conveyor. The support 35 is of a highly polished metal material such as nickel steel and is maintained scrupulously clean to prevent contamination and surface deformation of the film casting to be supported thereby. Also, the support 35 has a release agent applied thereto from a swabbing means 36 which facilitates the removal of the self-supporting film therefrom as disclosed in the Crosby patent.

Spaced from the support 35 is a suspension dispensing means 27 which includes a hopper 28 wherein a supply of the suspension is contained and a gate 37 wherefrom the suspension is issued in an amount and at a rate determined by the adjustable setting thereof. Also, the issuance of the suspension from the gate 37 is partially controlled by the pressure exerted on the suspension as fully detailed in the above-mentioned patent to Crosby.

Intermediate the gate 37 and the support 35 of the conveyor 25 is a plurality of laterally spaced conductors 39 extending longitudinally along the conveyor 25. These conductors 39 are fed from individual spools 41 supported by the spool holder 31 through individual apertures 43 in the tension device 29 and intermediate the gate 37 and the support 35. These conductors 39 are in substantial parallel alignment and preferably contiguous with the support 35 to which they are temporarily attached at a jointure 45 by holding means 47 such as a piece of tape for instance. This temporary attachment is necessary only at the beginning of the process and permits the application of a longitudinal tensional force on the conductors 39. After the process has been started and the jointure 45 approaches the vicinity of the take-up spool 33, the conductors 39 are tenaciously held by the adherence of the film thereto and to the support 35 thereby permitting the removal of the holding means 47 and attachment jointure 45 without loss of the tensional force exerted on the conductors 39 as will be more fully explained hereinafter.

Referring to the illustration of FIG. 4, a drying means 49 is spaced from the dispensing means 27 along the conveyor 25 and consists of any one of a number of means ordinarily used to provide a warm current of air. For example, heat lamps or an electric air heater are applicable and appropriate so long as the temperature of the air can be controlled.

Spaced further along the conveyor 25 intermediate the drying means 49 and the take-up spool 33 is a firing means 51. This firing means 51 preferably has a reducing atmosphere to prevent oxidation of the metal particles during the volatilization of the organic constituents and the sintering of the metal particles to each other and to the conductors 39. Naturally, the firing means 51 must be able to provide sufficient heat to cause the sintering of the particles and the amount of heat required is, of course, dependent upon the constituents of the film.

The take-up spool 33 operatively cooperates with the conveyor 25 and provides a means of storage for the pliable self-supporting metal strip upon leaving the firing means 51. Alternately, the take-up spool 33 may be disposed immediately after the drying means 49 and the pliable self-supporting film stored thereon prior to the firing thereof.

In the process for providing electrodes suitable for use in a storage battery, the above-described suspension is deposited into the dispensing means 27 and the conductors 39 affixed to the support 35 of the conveyor 25 in a manner previously described wherein the conductors 39 have a longitudinal tensional force exerted thereon and are contiguous with the support 35 and intermediate the support 35 and the dispensing means 27.

Upon activation of the conveyor 25, the support 35 and conductors 39 progress longitudinally along the conveyor 25, and the suspension is flowed thereon to provide a film casting. This film casting is conveyed into the drying means 49 wherein warm air currents are directed thereon to cause the evaporation of the solvents from the casting.

During the drying process it has been found that the rate of solvent evaporation should be substantially equal to the rate of duffusion of the solvents through the film. When these rates are not substantially equal, defects such as bubbles and cracks are evident in the resulting film. Also, as the solvents are evaporated from and diffused through the film, it has been found that the film shrinks and tenaciously adheres to the tensionally held conductors therein. Thus, the difficulties of the casting shrinking a greater amount and pulling away from the conductors, common to many casting techniques, is not a problem in this process. Moreover, the adherence of the film and conductors is such that the conductors need no longer be affixed to the support once the process has started.

Upon leaving the drying means 49, there is provided a self-supporting pliable film having a thickness in the range of about 0.005 to 0.100 inch and including therein the conductors 39 and metal particles in the range of approximately 75 to 97% by weight of the film. When the film has a thickness less than about 0.005, it has been found that handling thereof without rupture or the conductors being forced therefrom is especially difficult and requires special and rather expensive apparatus. Also, control over the evaporation and diffusion rates of the solvents becomes increasingly difficult as the film thickness increases and films having a thickness greater than about 0.100 inch have not been fabricated, thus far, without cracks and blemishes therein. Moreover, the metal content is limited to the above range for the same reasons set forth in the previous discussion of the suspension.

This self-supporting pliable film may be spooled and stored, but preferably the film is conducted into a firing means 51. Herein, the organic constituents are volatilized from the film and the metal particles sintered to each other and to the conductors 39. It has been found that the dimensions of the film are reduced by the firing process and films have been provided having a thickness in the range of about 0.004 to 0.060 inch. Also, it is well known that a relatively low firing schedule increases the porosity of the film but reduces the strength thereof while a relatively high firing schedule reduces the porosity and increases the film strength because of the increased contact of the metal particles. Thus, it has been found that the porosity of the pliable self-supporting metal strip is controllable within a range of about 50–90%.

Thereafter, the pliable self-supporting metal strip may be processed in a number of different sequences. For example, the metal strip may be stored on the take-up spool 33 and transported to another location for subsequent processing or the strip may be fed directly to a means for cutting a desired electrode configuration. Also, the previously mentioned score marks 13 may be added to the film or to the metal strip by any one of numerous methods adapted to such processes. Moreover, when an integral tab 15 is included in the electrode configuration, compaction thereof may be carried out in accordance with any one of a number of well-known compacting processes.

Having provided the plate structure for an electrode, the active electrode materials may be introduced into the pores thereof by any of the techniques well known in the art. These processes are applicable either before or after the porous plate structure has been introduced into the battery container as well as before or after the plate structure has been cut to the desired electrode configuration.

As a specific example of the process, the following suspension has provided excellent results:

| | |
|---|---|
| Toluene | ml__ 400 |
| Synasol | ml__ 175 |
| Diethylene glycol monobutyl ether | ml__ 25 |
| Butyl alcohol | ml__ 25 |
| Ethyl cellulose | gm__ 50 |
| Grade B carbonyl nickel powder | gm__ 675 | in which the ethyl cellulose has an ethoxyl content of between 47.5 and 49.0% and a viscosity of approximately 200 centipoises in a 5% solution of 80:20 toluene to ethyl alcohol.

The suspension is prepared by measuring the solvents, dissolving the ethyl cellulose therein, adding the metal particles, and ball-milling the mixture for about 16 hours. This particular suspension contains approximately 53.34% of metal particles by weight and has a viscosity of about 50,000 cps. A plurality of nickel wire conductors having a diameter of about 0.005 inch were laterally spaced about ⅛ inch apart and affixed to the support 35 in a manner described above.

The conveyor 25 was activated and the suspension, disposed within the dispensing means 27, was continuously cast onto the support 35 and the conductors 39 to provide a film casting having a width of about 6½ inches and a thickness of approximately 0.060 inch. As the conveyor continued to move, the film casting was conducted into the drying means 49 and remained therein for approximately 20 minutes while air currents at a temperature of about 300° F. were directed thereon. Herein, was provided a pliable self-supporting film having a thickness of about 0.040 inch and containing metal particles in an amount of about 91.84% by weight of the film.

Then, the pliable self-supporting film was conveyed to the firing means 51 wherein the film was exposed for approximately 3 minutes to a reducing atmosphere at a temperature of about 1,400° F. Thus, there was provided a pliable and porous self-supporting metal strip having a thickness of about 0.036 inch and a porosity of about 82%. This metal strip, including the conductors therein, was temporarily stored on the take-up spool 33.

The metal strip was subsequently scored in a manner substantially as shown in FIG. 2 of the drawings and then cut to an electrode configuration which included a tab portion 15. This tab portion 15 was compacted to a density of about 97% by applying a pressure of approximately 50 tons per square inch thereto, and the pores of the uncompacted plate structure were loaded with active electrode material in a manner well known in the art to provide an electrode suitable for use in an alkaline storage battery.

Thus, there has been provided an electrode and a process for the fabrication thereof having unique and unusual qualities and advantages over any of the known electrodes or processes. For instance, the continuous process of fabricating a porous structure having conductors integral therewith provides a reduction in cost, time, labor, required skill, and numerous other factors which are not believed to be possible with a "batch" process. The uniformity and repeatability of thickness and porosity of the structure, as well as the self-supporting features of the film and the metal strip, permitting convenient storage, shipment, and subsequent use thereof, are as far as is known, unavailable by any other process.

Further, the resultant electrodes with integral conductors permit the fabrication of alkaline storage batteries of increased capacity without any sacrifice in uniformity or consistency due to variations in electrode thickness and porosity. These electrodes, because of the integrated conductors and score marks, permit circular configurations with a consistency previously unknown while the integrated tab feature eliminates the problems and processes of tab attachment common to the known techniques.

While there have been shown and described what are at present considered to be the preferred embodiments of the invention, it will be obvious to those skilled in the art that various changes and modifications may be made therein without departing from the invention as defined by the appended claims.

What is claimed is:

1. In a storage battery, the improvement in combination therewith comprising an electrode comprising a porous layer of sintered metal particles having a thickness dimension in the range of about 0.005 to 0.060 inch with the pores thereof loaded with active electrode material, a compacted tab portion integral therewith and extending outwardly therefrom, said electrode having adjacent a surface thereof a plurality of parallelly aligned and laterally spaced conductors integral with said layer and said tab portion, and a plurality of parallelly aligned and laterally spaced score marks on a surface of said electrode which is substantially parallel to the aforementioned surface and extending in a direction normal to the direction of said aligned conductors.

2. In a storage battery, the improvement in combination therewith comprising an electrode comprising a porous layer of sintered metal particles, a compacted tab portion integral therewith, a plurality of parallelly aligned and laterally spaced conductors integral with said layer and said tab portion, and a plurality of parallelly aligned and laterally spaced score marks on one surface of said layer, said porous layer having a thickness dimension in the range of about 0.005 to 0.060 inch with the pores thereof loaded with active electrode material, said conductors displaced from the center of said layer in the direction of said thickness dimension, and said score marks in parallel alignment with and extending in a direction normal to said conductors on the surface of said layer opposite to the direction of said conductor displacement therein.

3. In a storage battery, the improvement in combination therewith comprising: a porous layer of sintered metal particles having the pores thereof loaded with active electrode material, a compacted tab portion integral therewith and extending outwardly therefrom, a plurality of parallelly aligned and laterally spaced electrical conductors integral with said porous layer of metal particles and said tab portion and a plurality of parallelly aligned and laterally spaced score marks on at least one surface of said porous layer.

4. The improvement of claim 3 wherein the electrical conductors are displaced from the center of said layer in the direction of the thickness of said porous layer and the opposite surface is provided with laterally spaced score marks.

References Cited by the Examiner

UNITED STATES PATENTS

| 2,672,494 | 3/1954 | Fleischer | 136—29 X |
| 3,023,259 | 2/1962 | Coler et al. | 136—28 X |
| 3,037,066 | 5/1962 | Grieger et al. | 136—28 X |
| 3,041,388 | 6/1962 | Fukuda et al. | 136—28 X |

WINSTON A. DOUGLAS, *Primary Examiner.*

JOHN H. MACK, *Examiner.*

B. OHLENDORF, *Assistant Examiner.*